358-86. XR 2,974,188 SR

T5001
X5002

March 7, 1961 H. M. DIAMBRA 2,974,188

BILATERAL VIDEO TRANSMISSION SYSTEM

Filed Dec. 19, 1956 3 Sheets-Sheet 1

INVENTOR

Henry M. Diambra

BY Max L. Libman

ATTORNEY

INVENTOR

Henry M. Diambra

BY Max L. Libman

ATTORNEY

INVENTOR
Henry M. Diambra
BY Max L. Libman
ATTORNEY 2,974,188
Patented Mar. 7, 1961

2,974,188

BILATERAL VIDEO TRANSMISSION SYSTEM

Henry M. Diambra, Silver Spring, Md., assignor to Citizens Bank of Maryland, Riverdale, Md., and Small Business Administration, Richmond, Va.

Filed Dec. 19, 1956, Ser. No. 629,378

11 Claims. (Cl. 178—5)

The present invention relates to bilateral communication circuits and more particularly to a closed-loop television system permitting of the simultaneous bilateral communication (both audible and visual) between television transmitters and receivers over a unitary transmission line.

In recent years there has been a considerable increase in utilization of closed-loop, radio-frequency television circuits, for example, by industry and the banking and medical professions to provide rapid visual and aural communication between remote locations. The cost of the prior art closed loop television systems has been quite high due in part to the fact that bilateral communication required two complete and separate unilateral communication systems, each for one direction of communication. Specifically, where bilateral transmission was required, a television transmitter and receiver was disposed at each of the locations between which communication was desired and a separate coaxial line with its associated booster equipment or equipments interconnected a receiver and a transmitter situated at opposite ends of the communication link. Since expensive coaxial cables and amplifiers (in the booster circuits) must be employed at the frequencies involved in television communication, the cost of the system was excessive due to the necessity for two distinct unilateral channels for bilateral communication.

In accordance with the present invention a single coaxial transmission line may be employed for bilateral communication between remote locations in consequence of novel isolation circuits employed in the booster equipment and in the terminal equipments at the two ends of the transmission link and further in consequence of a novel arrangement of high and low pass filters in the booster equipment. The booster equipment employs a single broad band amplifier for amplifying information at all frequencies employed in the system and a novel arrangement of band pass filters for routing and preventing interaction between the information signals lying in distinct frequency bands and proceeding in opposite directions along the coaxial transmission line. Specifically, the booster equipment or equipments disposed at spaced locations intermediate the terminal equipments, employ a four-arm impedance bridge network having two pairs of opposed arms, two input terminals each connected to a distinct section of coaxial line and two conjugate terminals having a broad band radio frequency amplifier connected therebetween. The several channels of information proceeding in one direction are grouped in a first frequency band and the several channels of information proceeding in the opposite direction are grouped in a second frequency band distinct from the first. A first pair of opposed arms of the bridge each includes a band pass filter offering a low impedance to the one frequency band and a high impedance to the other frequency band while the second pair of opposed arms each includes a band pass filter offering a high impedance to the one frequency band and a low impedance to the other frequency band. In one specific embodiment of the present invention, a three terminal, directional line splitting coupler, which may be of the type disclosed and claimed in copending patent application Ser. No. 400,256, filed on December 14, 1953, now Patent No. 2,782,379, by Henry M. Diambra and George G. Edlen, for Directional Line Splitting Coupler, may be employed at each junction of two arms of the bridge and the coaxial line and at each junction of two arms of the bridge and the input and output circuits of the broad band amplifier. The directional coupler provides a low impedance path between a first terminal and each of the two other terminals and a high impedance between the two other terminals. The couplers are connected to provide high impedance between the two arms of the bridge at each junction and to provide low impedance between each arm and the coaxial line or the amplifier circuit. The bridge arrangement provides a distinct low impedance path through the broad band amplifier for information signals in each frequency band; only a very small portion of the signals in one frequency band appearing in the path provided for the other frequency band due to the high impedance provided by the filters at the former frequencies and further due to the high impedance between adjacent arms provided by the directional couplers. This feature of the present invention; that is, the high attenuation of signals of one frequency band in the path through the network for the other frequency band, permits the utilization of a single amplifier for signals in both frequency bands. The signals entering the booster network having just proceeded through a thousand or more feet of coaxial cable and are of quite low intensity. The amplifier therefore must have a high gain to amplify the incoming signals sufficiently to produce amplified signals capable of detection at the end of another thousand or more feet of coaxial linking the network with the terminal equipment or a further booster network. The amplified signals are applied to the coaxial cable at a junction of the arms of the network, as previously described, at which signals proceeding in the opposite direction over the transmission link are applied to the booster network. Therefore, a closed-loop is provided comprising the amplifier, the arm of the bridge between the output circuit of the amplifier and the coaxial lead, and the arm of the bridge between the coaxial lead and the input circuit of the amplifier. If the gain of this closed-loop is unity or greater, the circuit would ring and would obviously be inoperative. However, as a result of the attenuation provided between the arms of the bridge by the directional couplers and the further attenuation of the information signals in one frequency band by the filter tuned to the other frequency band and connected between the coaxial cable and the input circuit of the amplifier, the gain of the aforesaid closed-loop is maintained at less than unity; thereby preventing ringing of the circuit. Consequently, a single broad band amplifier may be employed for amplifying the information in distinct frequency bands and proceeding in opposite directions through the transmission link and the booster network may be employed in a single coaxial cable transmission link for bilateral multichannel communication.

As in all transmission line work, the coaxial lines and filters must be terminated in their characteristic impedance. In the specific embodiment of the invention under consideration; that is, in a system employing directional couplers, the transmission lines connected to the booster networks feed R.F. power through the directional coupler to the two band pass filters. The band pass filter which accepts the R.F. energy in the frequency band of the incoming signals provides a termination for the line at its characteristic impedance while the impedance of the filter tuned to a different band presents an impedance many times that of the characteristic impedance. The directional coupler is a power divider circuit and the power applied over the coaxial line divides in an inverse ratio to the terminal impedances presented by the two filters. In consequence, only a small proportion of the input power is directed to the high impedance filter and this filter has the effect of a large impedance shunting the line's characteristic impedance. The total impedance seen by the line is only slightly less than its characteristic impedance and the VSWR is maintained within acceptable limits.

The filter of the booster equipment feeding the coaxial line is even more nearly terminated in its characteristic impedance than the coaxial line due to the additional attenuation between the two filters provided by the directional coupler. In a specific example, the directional coupler may provide 3 db of attenuation between the coaxial line and each of the filters while providing 20 db of attenuation between the two filters. The additional 17 db of attenuation effectively increases the impedance shunting the characteristic impedance presented by the coaxial line and therefore total impedance closely approximates the characteristic impedance of the filter.

In a second embodiment of the invention, the directional couplers may be eliminated and the filters are modified to perform the functions of the couplers relating to preventing ringing of the booster circuit and providing termination of the coaxial lines and the filters in their characteristic impedance. In order to perform the function of the couplers relating to the preventing of ringing of the booster circuit, the attenuation of the filters need merely be increased to compensate for the reduced attenuation resulting from removal of the couplers. Thus if the couplers provide 20 db of attenuation between the filters in each loop, the attenuation of the filters in their rejection region must be increased by a like amount.

The modification of the filters required to provide termination of the filters and coaxial lines in their characteristic impedances depends upon the type of band pass filters employed. The second embodiment of the present invention is described as employing series *m* band pass filters which are terminated at their input and output ends in series *m* half sections. Taking for example the junction of the high and low pass filters and the coaxial line, the coaxial line is connected to the low pass filter and the high pass filter respectively through an inductor and a capacitor; that is, the first shunt impedance of each filter is eliminated, and a series connected inductor and capacitor are connected across the line. The series circuit and the inductor to the low pass filter and the capacitor to the high pass filter define the series *m* half section referred to above and provide proper termination of the coaxial line and of the filter feeding the line. In the pass band of either filter the impedance presented at the coaxial line is the mid-shunt impedance of a series *m* derived filter and in consequence closely approximates a fixed resistance at the value of the characteristic impedance. Stated differently the one filter in its rejection band furnishes the impedance required by the other filter in its pass band to present the characteristic impedance to the line or the filter feeding the line.

An identical arrangement may be provided at the junction of the filters at the amplifier circuit. In both embodiments of the invention, impedance transformation circuits, which may take one of many known forms such as attenuation networks or impedance matching transformers, must be employed to match the input or output impedance of the amplifier to the characteristic impedance of the filters, if the filters feed or are fed by the amplifier directly or to the characteristic impedance of a coaxial cable connected between the junction of the filters and the amplifier circuit.

As previous indicated, the booster network is disposed between two sets of terminal equipments located at opposite ends of a transmission link.

Each terminal equipment includes at least one television transmitter and one television receiver, the transmitter at one end of the line generating signals in a frequency band to which the receiver at the other end of the line is tuned and the transmitter and receiver at the same end of the line being tuned to distinct frequency bands. The transmitter at one end of the transmission line must produce signals of sufficient intensity to be detectable at the booster equipment after traveling over and being attenuated by long lengths of coaxial cable. The signals received at this end of the line on the other hand, are of low intensity having been attenuated by the long length of coaxial cable connected between the terminal equipment and the booster circuit. The high intensity signals produced by a transmitter at one end of the line cannot produce ringing in the receiver located at the same end of the line since the receiver is tuned to a different frequency band. The transmitted signals; however, can overload or actually swamp the receiver and produce serious distortion of the low intensity incoming signals. In order to overcome this problem at the terminal equipment the transmitter is connected through a band pass filter, tuned to its frequency band, to one terminal of a directional coupler, the receiver is connected through a filter tuned to its frequency band to another terminal of the directional coupler and the third terminal of the coupler is connected to the coaxial lead. The attenuation provided by the directional coupler and a properly designed receiver filter may be made sufficient to prevent overloading of the receiver by the transmitted signals. As in the booster network, the directional couplers may be replaced by carefully designed band pass filters. With respect to both the terminal and booster equipments, the circuits employing directional couplers are preferred since the utilization of the couplers greatly reduces the complexity and cost of the filters and the design problems incident thereto. The highly-attenuated, locally generated signals appearing at the receiver are, however, of sufficient intensity to be detected by a receiver tuned to their frequency and a local monitor may be employed to detect these signals and provide at the transmitter a visual and audible reproduction of the transmitted information for guidance of personnel utilizing the transmitter.

The terminal equipment has thus far been described as employing only a single transmitter and a single receiver but it is within the scope of the present invention to employ multiple transmitters and receivers at each terminal equipment. The transmitters at each end of the television link transmit signals over distinct but adjacent video channels which fall within the common frequency band of their common band pass filter both at the terminal equipment and in the booster network. Similarly, multiple receivers at each end of the line may be tuned to distinct but adjacent video channels having frequencies falling within the pass band of their associated filters. Consequently, the apparatus operates successfully for one or more television channels in each direction of transmision as long as the frequencies of the signals proceeding in a common direction fall within the pass band of the filters.

Directional couplers are employed to prevent interaction between multiple transmitters or receivers at the same end of the line. Thus each transmitter or receiver is connected through a low impedance path of the coupler to a common line and the coupler isolates the transmitters or receivers one from the other in consequence of the high impedance between the terminals to which these elements are connected.

It is an object of the present invention to provide multichannel bilateral communication over a single transmission line.

It is another object of the present invention to provide a bilateral booster network for simultaneously amplifying information signals in adjacent frequency bands proceeding over a transmission line in opposite directions.

It is yet another object of the present invention to employ as a booster network in a bilateral transmission system, a four-arm band pass filter bridge having a broad band amplifier connected across its conjugate terminals.

It is another object of the present invention to provide a booster network for a multichannel bilateral transmission system employing a broad band amplifier for amplifying signals in all channels and employing a novel arrangement of directional line splitting couplers and band pass filters for preventing ringing of the amplifier.

Yet another object of the present invention is to provide a booster network for a multichannel bilateral transmission system employing a broad band amplifier for amplifying signals in all channels and employing a novel arrangement of properly terminated band pass filters for preventing ringing of the amplifier, and for properly terminating the elements of the circuit.

Still another object of the present invention is to provide a booster network disposed in a single coaxial transmission line of a closed loop television system and constituting a four arm impedance bridge having a broad band amplifier connected between its conjugate terminals and employing a novel arrangement of three-terminal, directional, line-splitting couplers connected between adjacent arms of the bridge and further employing band pass filters in the arms of the bridge to provide for proper routing of signals through the network and to prevent ringing of the amplifier.

It is another object of the present invention to provide a multi-channel, bilateral closed loop television system employing a single coaxial transmission line for interconnecting the two ends of the system.

Yet another object of the present invention is to provide a multichannel bilateral closed loop television system employing a single coaxial transmission line for interconnecting the two ends of the system.

Yet another object of the present invention is to provide a multichannel bilateral closed loop television system which may employ a single coaxial cable with associated booster networks for interconnecting the terminal equipments of the system in consequence of a novel arrangement of band pass filters in the terminal equipment and in the booster networks.

Still another object of the present invention is to provide a terminal equipment for closed loop television systems having at least one television transmitter and television receiver tuned to distinct frequencies and employing a novel arrangement of band pass filters and directional line splitting couplers for preventing overloading of the receiver by the high intensity signals generated by the transmitter.

It is another object of the present invention to provide terminal equipment for a closed loop television system having at least one television receiver and one television transmitter tuned to distinct frequencies and at least one monitor receiver for monitoring the signals generated by the transmitter and employing directional line splitting couplers and band pass filters for reducing the transmitter's signal to a sufficiently low intensity at the terminal equipment to prevent overloading of the video and monitor receivers.

The above and still further objects, features and advantages of the present invention will become apparent upon consideration of the following detailed description of two specific embodiments thereof, especially when taken in conjunction with the accompanying drawings wherein.

Figure 1:
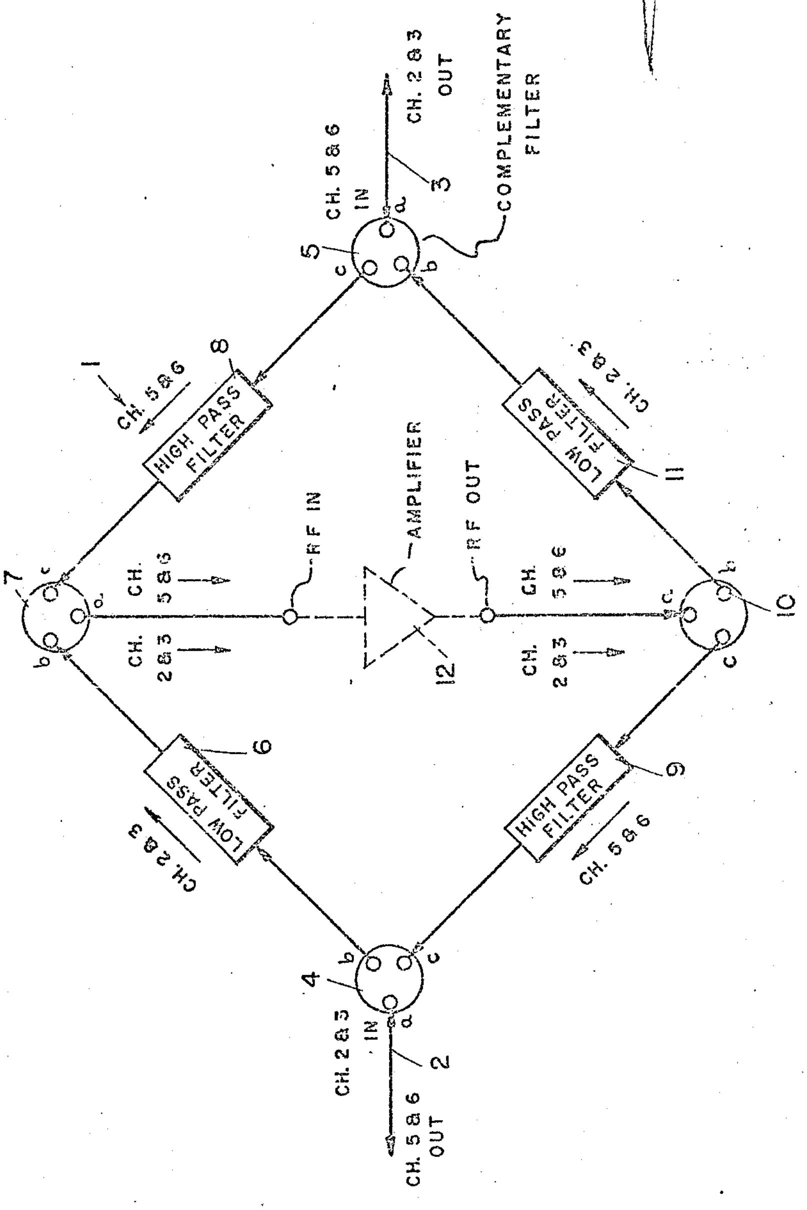
Figure 1 is a schematic circuit diagram of a novel booster network in accordance with the present invention.

Referring specifically to Figure 1, of the accompanying drawings there is illustrated a bilateral booster network 1 for simultaneously amplifying and transmitting in opposite directions video information signals lying in adjacent frequency bands. The bilateral transmission network 1 assumes the form of a four-arm impedance network having two input leads 2 and 3, the leads 2 and 3 representing long lengths of coaxial cable interconnecting the network 1 with further booster networks or television transmitting or receiving equipment not illustrated. The leads 2 and 3 are connected to terminal "*a*" of respective directional line splitting couplers 4 and 5 each having additional terminals *b* and *c*. The directional line splitting couplers 4 and 5 are adapted to provide a low impedance, producing an attenuation of signals of the order of 3 db, between terminals *a* and *b* and *a* and *c* and vice versa, and to provide a high impedance, producing an attenuation of signals of the order of 20 db, between terminals *b* and *c* and vice versa. The couplers 5 and 4 may be of the type disclosed and claimed in the aforementioned patent application No. 400,256, now Patent No. 2,782,379.

Figure 4:
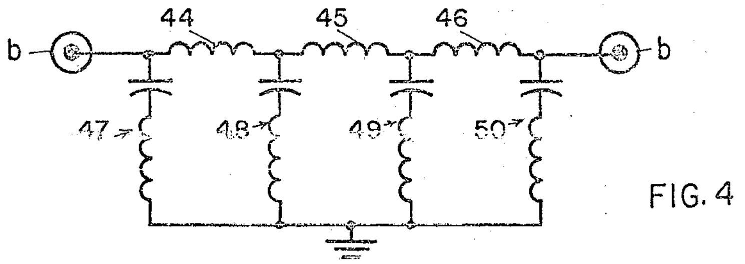
Figures 4 to 5 are schematic wiring diagrams of the low and high pass filter circuits respectively employed in the circuits of Figures 1 and 2.

The terminal "*b*" of the coupler 4 is connected through a low pass filter 6, illustrated in detail in Figure 4 of the accompanying drawing to a terminal "*b*" of a further directional coupler 7. Terminal *c* of the coupler 7 is connected through high pass filter 8 illustrated in detail in Figure 5 of the accompanying drawing, to the terminal *c* of the coupler 5. Terminal *c* of the coupler 4 is connected through a second high pass filter 9, identical with filter 8, to a terminal *c* of a still further directional coupler 10, and the terminal *b* of the coupler 10 is connected through a second low pass filter 11, identical to filter 6, to terminal *b* of the coupler 5. A broad band amplifier 12 is connected between the terminals *a* of couplers 7 and 10 and is adapted to amplify equal signals having frequencies falling within the band pass characteristic of the low pass filters 6 and 11 and the high pass filters 8 and 9.

Figure 2:
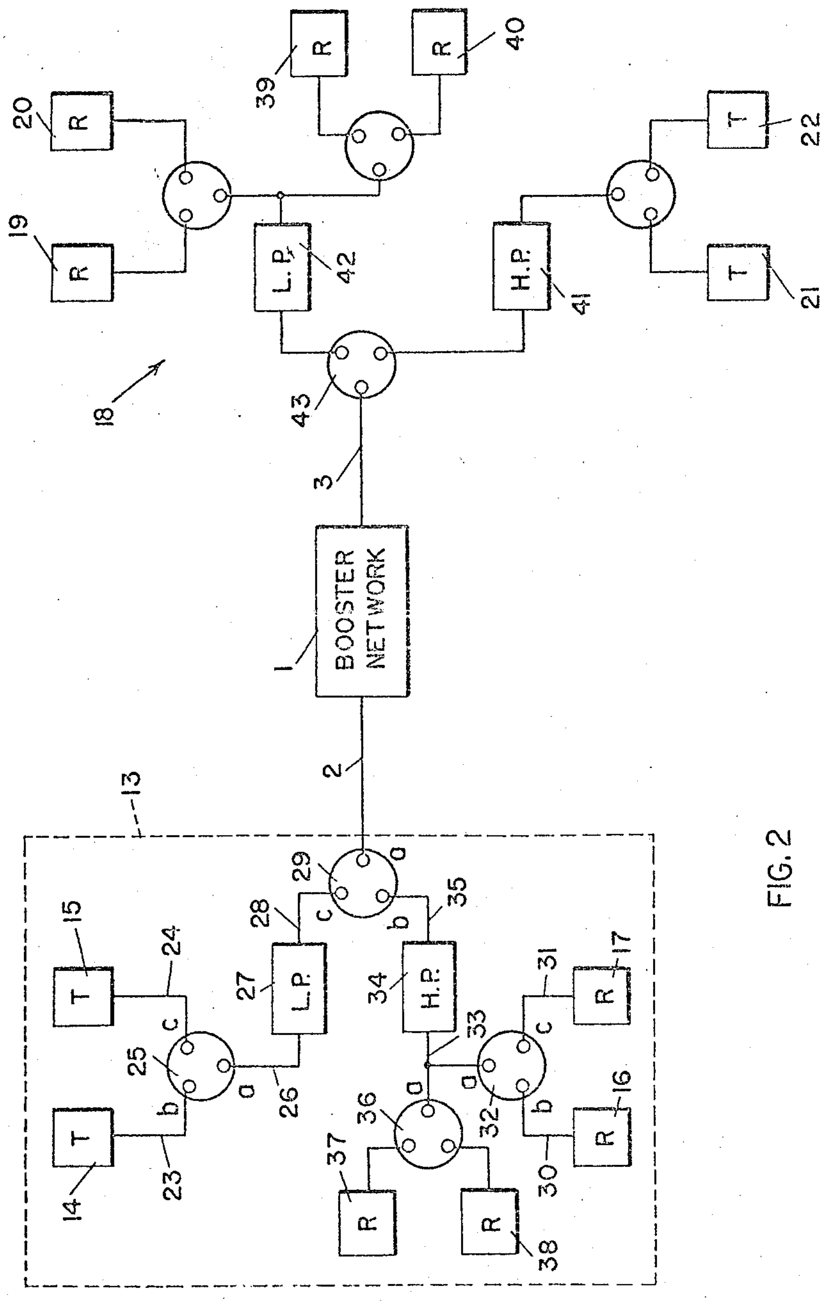
Figure 2 is a schematic circuit diagram of a multichannel closed-loop television system employing the network of Figure 1.

The unconnected ends of the leads 2 and 3 are connected to distinct terminal equipments as illustrated in Figure 2 of the accompanying drawings which is described in detail subsequently. The equipment associated with lead 2 is adapted to transmit video information lying in the frequency band of the filters 6 and 11 and to receive information lying in the frequency band of the filters 8 and 9. Conversely the equipment associated with lead 3 is adapted to transmit and receive video information lying within the frequency band of the filters 8 and 9 and 6 and 11 respectively. For purposes of example only it is assumed that each terminal equipment includes two television transmitters and two television receivers and that the two transmitters associated with lead 2 transmit, respectively, the frequencies of television channels 2 and 3 and that the two transmitters associated with lead 3 transmit, respectively, the frequencies of television channels 5 and 6. The filters 6 and 11 have a cutoff frequency of 66 mc./sec. and produce an insertion loss of only 1 db for signals in the range of frequencies of 66 mc./sec. or lower and produces an attenuation of at least 50 db for signals in a range of frequencies from 76 mc./sec. and higher. Consequently, the filters 6 and 11 provide a low attenuation path for signals in channels 2 and 3 which are below 66 mc./sec. and provide a high attenuation for signals at the frequencies of channels 5 and 6 which are above 76 mc./sec. The filters 8 and 9 are high pass filters having a low end cut off frequency of 76 mc./sec. and provide a low insertion loss of 1 db, for signals at 76 mc./sec. and higher and a high attenuation for signals below this frequency, attenuating signals at 66 mc./sec or lower by 50 db.

Describing the operation of the bilateral network of Figure 1, information signals applied to lead 2 and having frequencies of channels 2 and/or 3 appear at terminal "*a*" of coupler 4 and proceed through connector 4 to its terminals *b* and *c*. The signals appearing at terminal *b* proceed through the filter 6 and receive only 1 db of attenuation while signals appearing at terminal *c* are subjected to 50 db of attenuation. The signal divides between these two paths in accordance with the inverse of the attenuation ratio and the major portion proceeds through filter 6 and the coupler 7 to the amplifier 12, where they are amplified and applied via coupler 10, filter 11 and coupler 5 to the lead 3. The total attenuation of the signal by couplers 4, 5, 7 and 10 and filters 6 and 11 is 14 db and if the signal energies are increased 60 db by the amplifier 12, a net gain of 46 db is provided.

The impedance of the filter 6 presented to the line 2 is approximately equal to the characteristic impedance of the line for signals within the pass band of the filter 6. The impedance presented to the line 2 by the filter 9 for signals in its rejection band is considerably greater than the characteristic of the line and might produce serious reflection problems if it were not for the coupler 4. Since coupler 4, as do the other couplers 5, 7 and 10, divides the signal power in accordance with the inverse ratio of the impedances presented to the line 2 by the filters 6 and 9, only a small proportion of the input power is divided to the filter 9 and therefore reflection of signals in consequence of the impedance mismatch between the line 2 and filter 9 has little effect upon the VSWR of the circuit.

In the same vein, the impedance mismatch resulting from the filter 6 appearing across the output circuit of filter 9 has little effect on the impedance presented by line 2 to filter 9 in consequence of the 20 db attenuation subsisting between terminals *b* and *c* of coupler 4 which appears in series with the 50 db attenuation provided by the filter 6.

The above analysis of impedance effects of the filters outside of their pass bands applies with equal validity to the other three terminal junctions in the network 1. In order for the amplifier 12 to present the proper impedance to the junctions at couplers 7 and 10 the impedance of the input and output circuits of the amplifier 12 must be matched to the characteristic impedance of the filters. This matching may be effected by conventional circuits such as matching transformers or attenuation networks.

The signals falling in the frequency range of channels 5 and 6 are applied to the lead 3 and proceed through the coupler 5 to its terminals *c* and *b*. The signals appearing at terminal *c* proceed through the filter 8 and are attenuated only 1 db while the signals appearing at terminal *b* are attenuated 50 db by the filter 11. Consequently, the signals appearing on lead 3 proceed through filter 8, coupler 7, amplifier 12, coupler 10, filter 9 and coupler 4 to the lead 2. Since the amplifier 12 is a broad band amplifier the signals applied to lead 3 are amplified to the same extent as the signals appearing on lead 2 and the net gain for the former signals is 64 db.

The utilization of a single amplifier 12 and consequently a single booster network 1 is possible as a result of effective isolation of the input and output circuits of the amplifier 12 which prevents a ringing of the network at its operational frequencies. The amplifier 12 in conjunction with the filters 9 and 6 and filters 11 and 8 constitutes respectively two closed loop regenerative circuits which will ring; that is, oscillate at the signal frequencies, unless the gain of each of these two closed loops is maintained at less than unity. Sufficient attenuation of the signals proceeding through closed loops is achieved in accordance with the present invention in consequence of the high signal isolation attenuations provided by the couplers 4 and 5, and filters 6 and 8. Thus, the signals falling within the pass band of filter 9 and appearing at terminal *c* of coupler 4, are attenuated 20 db in passing from terminals *c* and *b* of coupler 4 and are attenuated another 50 db by the filter 6. This constitutes a total attenuation of 70 db and since the total amplification of the signals by the amplifier 12 is only 60 db, the gain of the loop is less than unity and the circuit will not ring.

It is apparent from the above description that the booster network 1 permits multichannel bilateral transmission of information signals in adjacent frequency bands. The utilization of the directional connectors 4, 5, 7 and 10 and the filters 6, 8, 9 and 11 effects proper routing of the signals of different frequencies through low impedance paths in series with the unitary amplifier 12 and prevents ringing of the network. Consequently, the network 1 provides a transmission system utilizing a minimum of circuit components and a single amplifier to achieve multichannel bilateral transmission over a single coaxial transmission line. The high signal gain achieved by the network 1 permits it to be placed intermediate long lengths of transmission lines and minimizes the totality of equipment required in any given transmission path length thereby materially reducing the cost of the equipment over prior art apparatus.

The network 1 is particularly adapted for employment in a closed loop multichannel television circuit employing multiple television transmitters and television receivers at each terminal equipment. Referring specifically to Figure 2 of the accompanying drawings which illustrates a bilateral multichannel closed loop television system employing the network 1 of Figure 1, a first terminal equipment 13 comprises television transmitters 14 and 15 which for example only, transmit information at the frequencies of video channels 2 and 3 respectively and television receivers 16 and 17 which for example receive information at the frequencies of video channels 5 and 6. The first terminal equipment 13 is connected via coaxial lead 2, the bilateral network 1 and the coaxial lead 3 to a second terminal equipment 18. The terminal equipment 18 includes television receivers 19 and 20 adapted to receive information at the frequencies of television channels 2 and 3, respectively and transmitters 21 and 22 for transmitting information at the frequencies of television channels 5 and 6 respectively. Information signals generated by transmitters 14 and 15 proceed from left to right as viewed in Figure 2 and are received by receivers 19 and 20, respectively, while information signals generated by transmitters 21 and 22 proceed from right to left as viewed in Figure 2 and are received by receivers 16 and 17, respectively. Consequently, the apparatus illustrated in Figure 2 permits two, distinct bilateral transmissions (both video and audio) to be carried on simultaneously.

In order to effectively isolate the various elements of each terminal equipment from one another, a network employing directional couplers and low and high pass filters is utilized. More specifically the transmitters 14 and 15 are connected over coaxial leads 23 and 24 to terminals *b* and *c* of a directional coupler 25. Terminal *a* of the coupler 25 is connected via lead 26 low pass filter 27 and lead 28 to terminal *c* of a directional coupler 29 and through the directional coupler 29 to the lead 2. The filter 27 is identical to filters 6 and 11 of Figure 1. The coupler 25 provides a 20 db attenuation between terminals *b* and *c* and therefore effectively isolates the transmitters 14 and 15 from one another. The receivers 16 and 17 are connected respectively over leads 30 and 31 to terminals *b* and *c* of a directional coupler 32, and terminal *a* of coupler 32 is connected via lead 33, high pass filter 34, and lead 35 to terminal *b* of the directional coupler 29 and through coupler 29 to the lead 2, the filter 34 being identical to filters 8 and 9 of Figure 1. The coupled 32 provides 20 db of attenuation between receivers 16 and 17 and thereby effectively isolates one from the other while the coupler 29 and high pass filter 34 prevent the receivers 16 and 17 from being overloaded by the signals generated by the transmitters 14 and 15.

The signals generated by the transmitters 14 and 15 are applied to a long length of coaxial cable; for example 2000 feet, represented by lead 2 and must be of sufficient intensity to be distinguishable over background noise at the network 1. On the other hand the signals applied to the receivers 16 and 17 have just traveled over the same length of cable 2 from the network 1 and are of quite low intensity. Consequently, the gain in the tuner stages of the receivers 16 and 17 must be quite high and the receivers would become overloaded by the signals generated by transmitters 14 and 15 in the absence of specific circuitry for attenuating the latter signals. This circuitry includes the coupler 29 which produces a 20 db attenuation of the signals generated by transmitters 14 and 15 and which appear on lead 35 and the filter 34 produces a further attenuation of these signals of 50 db. Consequently, a total attenuation of 70 db is provided and the channel 2 and 3 signals appearing on lead 33 are of a sufficiently low intensity to be tuned out by the receivers 16 and 17. However, the channel 2 and 3 information signals appearing on lead 33 are of a sufficient energy level to be detected by appropriately tuned receivers which receivers may be employed as monitors for the transmitters 14 and 15. In order to provide such a monitoring system the lead 33 is connected to terminal "*a*" of a further directional coupler 36 and the terminals *b* and *c* thereof are connected respectively to a channel 2 receiver 37 and a channel 3 receiver 38. In this arrangement the coupler 29 and high pass filter 34 which prevent the receivers 16 and 17 from being overloaded by the signals generated by transmitters 14 and 15 also serve to attenuate these signals sufficiently to permit the utilization of local monitors or receivers 37 and 38 which provide for both visual and oral monitoring of the information transmitted by transmitters 14 and 15 respectively.

The terminal equipment 18 may employ monitors 39 and 40 and is identical with equipment 13 except that the high pass and low pass filters are interchanged. Thus a high pass filter 41 is included in the transmitter circuit between transmitters 21 and 22 and the coupler 43. The filters 27 and 41 of equipment 13 and 18 serve the identical function of routing the incoming signals to the receiver channels by providing a high attenuation in the transmitter circuits at the frequencies of the incoming signals.

As in the circuitry of the booster network 1, the directional couplers 29 and 43 serve not only as elements for attenuating signals, but in their capacity of power dividers they effect proper termination of the lines 2 and 3 and the transmission circuit filters 27 and 41.

It is apparent from the preceding description that the apparatus of the present invention provides a highly flexible, closed loop television system capable of multichannel bilateral communication over a single transmission line. The utilization of a single transmission link between the terminal equipments effects a considerable saving of expensive coaxial cable and broad band amplifiers. Further the terminal equipment and the network 1 employ a small number of substantially identical elements which minimizes fabrication costs.

The system of the present invention has been described as employing only two channels of transmission in each direction but it is within the scope of the present invention to employ additional channels for each direction of transmission. Thus, transmission may occur in one direction on channels 2 to 6 and transmission in the other direction over channels 7 to 13, this division of channels simplifying design of the low and high pass filters since the frequency bands transmitted in the two directions are widely separated. The additional transmitters and receivers can be connected to the receiver and transmitter circuits in the same manner the monitors 37 and 38 are connected to lead 33.

The system of the present invention as thus far described has been limited to circuits employing directional line-splitting couplers in both the booster network 1 and in the terminal equipments 13 and 18. In a second embodiment of the invention the directional couplers may be omitted and the filters redesigned to effect the functions previously provided by the couplers. The couplers are employed in the circuitry of Figures 1 and 2 of the accompanying drawings in order to attenuate the signals around the loops provided by filters 6 and 9 and amplifier 12 and filters 8 and 11 and amplifier 12 sufficiently to prevent ringing of the circuits and were further employed to take advantage of their power dividing properties so as to properly terminate all elements of the circuit.

The former function of the couplers may readily be assumed by the filters by increasing their attenuation of signals outside of their pass band. Referring to the exemplary figures employed in the discussion of the circuitry of Figures 1 and 2, the filters would be required to provide an additional 20 db of attenuation upon removal of the couplers; that is, each filter would attenuate signals outside of its pass band by 70 db.

Modifications of the filters to effect proper termination of the lines requires redesign of their input and output circuits.

Figure 3:
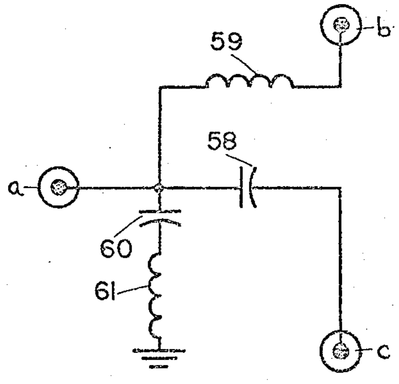
Figure 3 is a schematic wiring diagram of input and output circuits which may be employed with the high and low pass filters of Figures 1 and 2.
Figure 5:
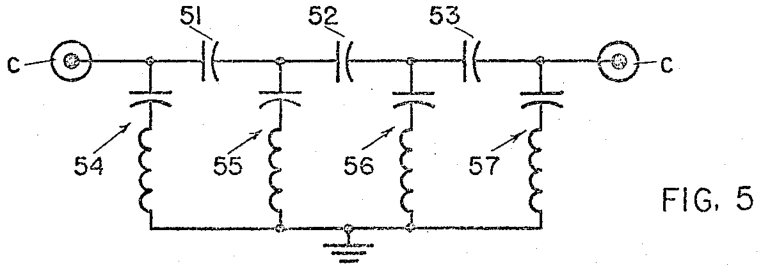

A type of low and high pass filters which may be employed in the circuits of Figures 1 and 2 are illustrated in Figures 4 and 5 respectively while the identical filter input and output circuits required in an apparatus not employing the couplers is illustrated in Figure 3 of the accompanying drawings.

Referring specifically to Figure 4 of the accompanying drawing the low pass filter comprises series *m* sections including for purposes of example only three sections defined by three series connected inductors 44, 45 and 46 and four complex shunt impedances 47, 48, 49 and 50 each having a capacitor and inductor connected in series. The design of this low pass filter is conventional and the design equations which must be employed to obtain the values of the various elements in order to effect the desired band width and attenuation of signals outside of its pass band are well known in the art. The series connected inductors 44—46 are shown connected between two terminals "*b*" which as will appear subsequently refer to the terminals "*b*" of Figure 3 of the accompanying drawings.

Referring to Figure 5 of the accompanying drawings, there is illustrated a high pass filter of the series *m* type. The high pass filter includes for the purposes of illustration only, three series *m* sections and comprises three series connected capacitors 51, 52 and 53 and four complex shunting impedances 54, 55, 56, and 57 each having a series connected capacitor and inductor. The capacitors 51–53 are illustrated as connected in series between two terminals "*c*" either of which corresponds to the terminal "*c*" of Figure 3.

As in the case of the low pass filter of Figure 4, the high pass filter of Figure 5 is of conventional design and the equations for determining the values of the various elements to obtain desired characteristics are well known.

Referring now to Figure 3 of the accompanying drawings, there is illustrated a network which comprises a series *m* half section for properly terminating the coaxial lines and the filters in equipments wherein the directional couplers are not employed. The network includes a capacitor 58 connected between terminals *a* and *c*, the terminal *a* being connected to a coaxial line and the terminal *c* being connected to one of the terminals *c* of Figure 5. Connected between the terminals *a* and *b* is an inductor 59, the terminal $b$ being connected to one of the terminals $b$ of Figure 4. A series circuit comprising a capacitor 60 and an inductor 61 is connected between the terminal $a$ and a point of reference potential, such as ground, to which the outer conductor of the coaxial cable is also connected. The series circuit therefore is connected across the coaxial cable.

As previously pointed out, the elements 58, 59, 60 and 61 constitute a series $m$ half section which may be considered as being derived by eliminating the first or last, as the case may be, shunt impedance of the respective series $m$ high and low pass filters and further by connecting a shunting impedance across the coaxial line.

When the filter circuits of Figures 3, 4 and 5 are arranged in a booster network 1 the circuit of Figure 3 constitutes the output circuit of one and the input circuit of the other of the filters of Figures 2 and 3. Thus if the terminal $a$ of Figure 3 is connected to the coaxial line 2 of Figure 1 or 2 the circuit of Figure 3 constitutes the input circuit of the low pass filter 6 and the output circuit of filter 9. With the terminal $a$ appropriately connected to the input circuit of the amplifier 12 the circuit of Figure 3 constitutes the output circuit of both filters 6 and 8 and if terminal $a$ is appropriately connected to the output circuit of the amplifier 12, the circuit of Figure 3 constitutes the input circuit of filters 9 and 11. In all of these arrangements, each of the filters and the coaxial lines are coupled to circuits having the proper input or output impedances in their pass band, this impedance being the midshunt impedance of a series $m$ derived section and by proper design this impedance may be made to equal the characteristic impedance of the coaxial lines.

Although the discussion of the circuits of Figures 3–5 has thus far been restricted to the booster network 1, the circuits, particularly of Figure 3 may be employed in the terminal networks of 13 and 18 of Figure 2. Either or both of the couplers 29 and 43 of this latter figure may be replaced by the circuit of Figure 3 to provide proper termination of the filters 27 and 34 and line 2 or filters 41 and 42 and line 3.

It is apparent from the above discussion that the system of the present invention provides a bilateral, multichannel communication network of highly flexible design which may employ various types of circuits and may operate in various portions of the frequency spectrum. Although the invention is described as particularly applicable to closed loop television systems, it is not intended to limit the scope of the invention to one particular field of communications since the principles of circuits set forth herein may be employed in various types of communication systems wherein bilateral, multichannel communication between remote locations over a single circuit is desired.

While I have described and illustrated one specified embodiment of my invention, it will be clear that variations of the general arrangement and of the details of construction which are specifically illustrated and described may be resorted to without departing from the true spirit and scope of the invention as defined in the appended claims.

What is claimed is:

1. A bilateral coaxial cable transmission line including a booster network for simultaneously transmitting in opposite directions over a conductive line, information contained in modulated independent carriers occupying separate broad frequency bands, said booster network comprising a four-arm impedance bridge having two pairs of opposite arms, two signal terminals and two conjugate terminals, first band pass means adapted to pass information in one of said frequency bands only, means connecting one of said first band pass means in each of said arms of one of said pair of opposite arms of said bridge network, second band pass means adapted to pass information in the other of said frequency bands only, means connecting one of said second band pass means in each of the said arms of the other pair of opposite arms, directional coupler means at each terminal of the network providing a high effective attenuation between adjacent arms of said bridge network and a low effective attenuation between said arms and said signal and conjugate terminals, a single broad band amplifying means for amplifying information in the two frequency bands, means connecting said amplifying means between said conjugate terminals, and means connecting each of said signal terminals to a coaxial cable through the directional coupler means at the signal terminals, said directional coupler means providing sufficient attenuation, together with the attenuation of said band pass means, to keep below unity the gain in the closed loop formed by said bridge while permitting high gain of the respective frequency bands in opposite directions through said bridge.

2. The combination in accordance with claim 1, wherein said coupling means comprise a three terminal network providing a low effective attenuation between a first terminal and the other two terminals and a high effective attenuation between said other two terminals and means connecting said other terminals to said bridge arms.

3. The combination in accordance with claim 1, wherein each of said band pass means is effective to pass information in at least two adjacent television channels distinct from the two adjacent television channels passed by the other of said band pass means.

4. The combination in accordance with claim 1, further comprising at least one television transmitter and one television receiver associated with each of said input leads, one of said transmitters and one of said receivers associated with different input leads being adapted to operate in one of said frequency bands and the other of said transmitters and receivers being adapted to operate in the other of said frequency bands, further directional coupling means providing a relatively low attenuation between each of said input leads and its associated transmitter and receiver and providing a relatively high attenuation between its associated transmitter and receiver, and further band pass means connected between each of said impedance means and its associated transmitter and receiver and providing a relatively high attenuation therebetween, said band pass means providing a relatively low attenuation path for information lying only in the frequency band of its associated transmitter or receiver.

5. The combination in accordance with claim 4 having at least two transmitters and two receivers associated with each of said input leads, the transmitters associated with one input lead operating in distinct portions of one of said frequency bands and the receivers associated with the one input lead operating in distinct portions of the other of said frequency bands, and additional directional coupling means providing a relatively low attenuation between said receivers and their associated band pass means and between said transmitters and their associated band pass means.

6. The combination in accordance with claim 5, further comprising at least one additional television receiver, and means connecting said additional television receiver between said further television receiver adapted to operate in the same frequency band as the transmitters associated with the same input lead as the latter of said receivers.

7. A coaxial cable transmission line comprising bilateral transmission network for simultaneously transmitting in opposite directions over a conductive line, information in adjacent frequency bands, said transmission network comprising at least two first filter means for passing information in one of said frequency bands and rejecting information in the other of said frequency bands, at least two second filter means for passing information in the other of said frequency bands and rejecting information in the one of said frequency bands, at least four, three terminal directional line splitting couplers each providing a low attenuation between first and second and first and third terminals and a high attenuation between said second and third terminals, two parallel transmission paths each comprising a series circuit including one of said first filter means, one of said second filter means and one of said directional couplers having its second and third terminals connected between said filter means, a broad band amplifier for amplifying signals in both of said frequency bands, means connecting said amplifier between first terminals of said directional couplers connected in said series circuits, at least two input leads, means connecting each of said input leads to a first terminal of a distinct directional coupler, means connecting one of said first and second filter means to the second and third terminals of one of said latter directional couplers and means connecting the other of said first and second filter means to the second and third terminals of the other of the latter of said direction couplers.

8. A coaxial cable transmission line comprising bilateral transmission network for simultaneously transmitting in opposite directions over a conductive line information in adjacent frequency bands, said transmission network comprising, at least two first filter means for passing information in one of said frequency bands only, at least two second filter means for passing information in the other of said frequency bands only, a plurality of three-terminal directional couplers, each providing a low attenuation path between a first terminal and the other two terminals and a high attenuation path between the other two terminals, a four arm bridge network having two signal terminals and two conjugate terminals, a broad band amplifier connected between said conjugate terminals of said bridge network, means connecting said two first filter means in a one pair of opposite arms of said bridge network and connecting said two second filter means in the other pair of opposite arms of said bridge network, one of said directional couplers being connected at each junction of said arms, and means interconnecting said arms and said directional couplers to provide high attenuation paths between said arms and low attenuation paths between said amplifiers and its associated arms and coaxial cable line sections respectively connected to said signal terminals.

9. A bilateral booster network for simultaneously transmitting in opposite directions over a conductive line, information in adjacent frequency bands, said booster network comprising a four-arm impedance bridge having two pairs of opposite arms, two signal terminals and two conjugate terminals, first band pass means adapted to pass information in one of said frequency bands only, means connecting one of said first band pass means in each of said arms of one of said pair of opposite arms of said bridge network, second band pass means adapted to pass information in the other of said frequency bands only, means connecting one of said second band pass means in each of the said arms of the other pair of opposite arms, a coaxial line connected to each of said input terminals, means for terminating each of said lines and said filters approximately in their characteristic impedances, broad band amplifying means for amplifying information in the two frequency bands and means for connecting said amplifying means between said conjugate terminals over coaxial leads.

10. The combination in accordance with claim 9 wherein said filters comprise $m$-derived filters and wherein said means for terminating each comprises a four terminal half section of an $m$-derived filter section having two terminals connected across its associated lead and one of each of the remaining terminals connected to a different one of its associated filters.

11. The invention according to claim 9, the impedances of said filters being so arranged that each of said filters in its rejection band provides the impedance required by the other filter in its pass band to present the characteristic impedance to said coaxial line.

References Cited in the file of this patent

UNITED STATES PATENTS

| | | |
|---|---|---|
| 2,021,743 | Nicolson | Nov. 19, 1935 |
| 2,258,275 | Black | Oct. 7, 1941 |
| 2,308,381 | Mertz | Jan. 12, 1943 |
| 2,414,101 | Hogan | Jan. 14, 1947 |
| 2,455,711 | Sziklai | Dec. 7, 1948 |
| 2,666,132 | Barrow | Jan. 12, 1954 |
| 2,695,332 | Caruthers | Nov. 23, 1954 |
| 2,776,429 | Olerud | Jan. 1, 1957 |
| 2,782,379 | Diambra et al. | Feb. 19, 1957 |